US012643207B1

(12) United States Patent
Rodriguez

(10) Patent No.: US 12,643,207 B1
(45) Date of Patent: Jun. 2, 2026

(54) COLDWORKING SLEEVE REMOVAL TOOLS AND METHODS

(71) Applicant: Lockheed Martin Corporation, Bethesda, MD (US)

(72) Inventor: Luis Rodriguez, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 19/084,233

(22) Filed: Mar. 19, 2025

(51) Int. Cl.
*B25B 27/02* (2006.01)

(52) U.S. Cl.
CPC .................................. *B25B 27/023* (2013.01)

(58) Field of Classification Search
CPC ....... B25B 27/023; B25B 27/02; B25B 27/00; B23P 15/48; B23P 15/28; B23P 15/00
See application file for complete search history.

(56) References Cited

U.S. PATENT DOCUMENTS 3,200,484 A 8/1965 Garman
3,566,662 A * 3/1971 Champoux .............. C21D 7/04 29/523
5,033,180 A 7/1991 Colson
5,218,854 A * 6/1993 Jarzebowicz ............ C21D 7/12 72/391.2
6,601,277 B1 8/2003 Swanson
6,910,252 B2 6/2005 Draggie et al.
7,302,746 B2 * 12/2007 Kuo ......................... C21D 7/12 29/243.517
7,484,281 B2 2/2009 Klann
7,926,319 B2 * 4/2011 Johnson ................. B21J 15/043 29/523
8,230,566 B2 7/2012 Oguri
8,353,193 B2 * 1/2013 Johnson ................. B21J 15/043 29/523
8,925,167 B1 1/2015 Miller
9,009,937 B2 4/2015 Saito et al.
2014/0345100 A1 11/2014 Huang et al.
2023/0339054 A1 10/2023 Berney

* cited by examiner

*Primary Examiner* — Lawrence Averick
(74) *Attorney, Agent, or Firm* — Whitaker Chalk Swindle & Schwartz PLLC; Bradley J. Birchfield

(57) ABSTRACT

A sleeve removal tool for removing a split sleeve embedded in a structure includes a main rod, a nose cap, a housing, and a nut. The main rod includes a main threaded portion and a neck portion. The nose cap is configured to removably couple to the neck portion of the main rod and to removably couple to a flare of the split sleeve embedded in the structure. The housing includes a non-marking foot. The housing is configured to at least partially surround the main rod. The nut is configured to be threaded onto the main threaded portion of the main rod, wherein threading the nut onto the main threaded portion of the main rod forces the housing against the structure and forces the main rod away from the structure, thereby removing the split sleeve from the structure.

14 Claims, 12 Drawing Sheets

COLDWORKING SLEEVE REMOVAL TOOLS AND METHODS

TECHNICAL FIELD

This disclosure generally relates to split sleeves used in coldworking, and more specifically to coldworking sleeve removal tools and methods.

BACKGROUND

Coldwork expansion is a manufacturing process where fastener holes are radially expanded in order to improve fatigue life. For example, crack-prone fastener holes of an aircraft are often cold worked with split sleeves in order to improve their fatigue life. Typically, coldwork expansion involves using a pulling tool to draw a mandrel with a preinstalled split sleeve through a hole. Often times, however, split sleeves become stuck in fastener holes and are unable to be removed after they have been used in the coldwork expansion process. Removing stuck split sleeves from fastener holes with existing tools such as vice grips or pliers poses a high risk in causing hole damage and generating highly extensive and costly repairs.

SUMMARY

In some embodiments, a sleeve removal tool for removing a split sleeve embedded in a structure includes a main rod, a nose cap, a housing, and a nut. The main rod includes a main threaded portion and a neck portion. The nose cap is configured to removably couple to the neck portion of the main rod and to removably couple to a flare of the split sleeve embedded in the structure. The housing includes a non-marking foot. The housing is configured to at least partially surround the main rod. The nut is configured to be threaded onto the main threaded portion of the main rod, wherein threading the nut onto the main threaded portion of the main rod forces the housing against the structure and forces the main rod away from the structure, thereby removing the split sleeve from the structure. In some embodiments, the sleeve removal tool further includes a washer that is installed around the main threaded portion of the main rod between the nut and the housing. In some embodiments, the sleeve removal tool further includes a pin that is configured to be removably coupled (e.g., threaded) to the neck portion of the main rod.

In some embodiments, a sleeve removal tool for removing a split sleeve embedded in a structure includes a main rod, a nose cap, a housing, and a nut. The nose cap is configured to removably couple to the main rod and to removably couple to a flare of the split sleeve embedded in the structure. The housing is configured to at least partially surround the main rod. The nut is configured to be threaded onto the main rod, wherein threading the nut onto the main rod forces the housing against the structure and forces the main rod away from the structure, thereby removing the split sleeve from the structure. In some embodiments, the sleeve removal tool further includes a washer that is installed around the main rod between the nut and the housing. In some embodiments, the sleeve removal tool further includes a pin that is configured to be removably coupled (e.g., threaded) to the main rod.

In some embodiments, a method for removing a split sleeve embedded in a structure includes placing a nose cap of a sleeve removal tool over a flare of the split sleeve embedded in the structure. The method further includes attaching a main rod of the sleeve removal tool to the nose cap such that the flare of the split sleeve is clamped between a portion of the nose cap and a portion of the main rod. The method further includes placing a housing of the sleeve removal tool over the main rod and the nose cap such that a non-marking foot of the housing contacts the structure. The method further includes threading a nut onto the main rod until the nut contacts the housing. The method further includes inserting an anti-rotation tool into the main rod. The method further includes tightening the nut against the housing while preventing the main rod from rotating with the anti-rotation tool, thereby removing the split sleeve from the structure. In some embodiments, the method further includes coupling a pin to the main rod. The pin has a diameter that permits the pin to be inserted into flare of the split sleeve, thereby facilitating the clamping of the flare of the split sleeve between a portion of the nose cap and a portion of the main rod.

Technical advantages of certain embodiments may include systems, tools, and methods for quickly and safely removing split sleeves that are embedded in structures such as aircraft components. The sleeve removal tool of certain embodiments is capable of extracting any size of split sleeve with minimal change to the tool. The sleeve removal tool of certain embodiments may be operated with hand tools (e.g., wrenches) without requiring pneumatic or hydraulic power, thereby simplifying current processes. The sleeve removal tool of certain embodiments is handheld, is portable, and is compact in size, which enables stuck split sleeves to be removed even in restricted-access applications.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present disclosure and its advantages, reference is now made to the following descriptions taken in conjunction with the accompanying drawings, in which.

Figure 1:
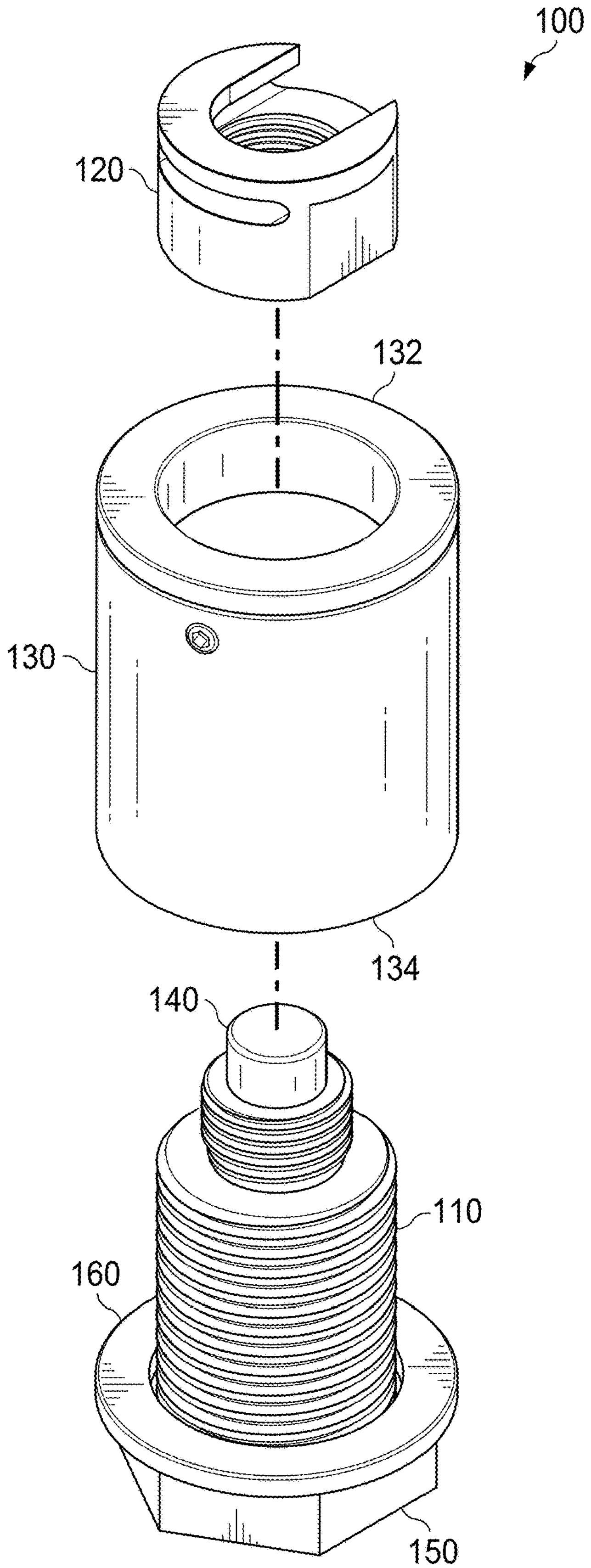
FIG. 1 is an illustration of the components of a sleeve removal tool, according to particular embodiments.

It should be understood that the drawings are not necessarily to scale and that the disclosed embodiments are sometimes illustrated diagrammatically and in partial views. In certain instances, details which are not necessary for an understanding of the disclosed methods and apparatuses or which render other details difficult to perceive may have been omitted. It should be understood, of course, that this disclosure is not limited to the particular embodiments illustrated herein.

DETAILED DESCRIPTION

The disclosure presented in the following written description and the various features and advantageous details thereof, are explained more fully with reference to the non-limiting examples included in the accompanying drawings and as detailed in the description. Descriptions of well-known components have been omitted to not unnecessarily obscure the principal features described herein. The examples used in the following description are intended to facilitate an understanding of the ways in which the disclosure can be implemented and practiced. A person of ordinary skill in the art would read this disclosure to mean that any suitable combination of the functionality or exemplary embodiments below could be combined to achieve the subject matter claimed. The disclosure includes either a representative number of species falling within the scope of the genus or structural features common to the members of the genus so that one of ordinary skill in the art can recognize the members of the genus. Accordingly, these examples should not be construed as limiting the scope of the claims.

A person of ordinary skill in the art would understand that any system claims presented herein encompass all of the elements and limitations disclosed therein, and as such, require that each system claim be viewed as a whole. Any reasonably foreseeable items functionally related to the claims are also relevant. The Examiner, after having obtained a thorough understanding of the disclosure and claims of the present application has searched the prior art as disclosed in patents and other published documents, i.e., nonpatent literature. Therefore, as evidenced by issuance of this patent, the prior art fails to disclose or teach the elements and limitations presented in the claims as enabled by the specification and drawings, such that the presented claims are patentable under the applicable laws and rules of this jurisdiction.

Coldwork expansion is a manufacturing process where fastener holes are radially expanded in order to improve fatigue life. For example, crack-prone fastener holes of an aircraft are often cold worked with split sleeves in order to improve their fatigue life. Typically, coldwork expansion involves using a pulling tool to draw a mandrel with a preinstalled split sleeve through a hole. Often times, however, split sleeves become stuck in fastener holes and are unable to be removed after they have been used in the coldwork expansion process. Removing stuck split sleeves from fastener holes with existing tools such as vice grips or pliers poses a high risk in causing hole damage and generating highly extensive and costly repairs.

To address the problem with stuck split sleeves from coldwork expansion processes used in manufacturing vehicles such as aircraft, the disclosed embodiments provide a coldworking sleeve removal tool and method. Instead of utilizing conventional tools such as pliers to remove stuck split sleeves used in the coldworking process, the disclosed embodiments provide novel tools and methods for removing stuck split sleeves that are efficient, effective, and do not damage sensitive structures such as components of an aircraft. According to some embodiments, a sleeve removal tool includes a main rod, a nose cap, a pin, a housing, a washer, and a nut. To easily and safely remove a split sleeve embedded in a structure, the nose cap of the sleeve removal tool may be placed over the flare of the split sleeve that is embedded in a structure. The main rod may then be attached to the nose cap (e.g., by screwing a neck portion of the main rod into the nose cap) and the pin that is attached to the main rod may be inserted into the split sleeve, thereby clamping the flare of the split sleeve between a portion of the nose cap and a portion of the main rod. The housing may then be placed over the main rod such that a non-marking foot of the housing contacts the structure around the stuck split sleeve. A nut may then be threaded onto the main rod until it contacts the housing (or, in some embodiments, until the nut contacts the washer that has been placed onto the main rod). The nut may then be tightened against the housing (e.g., using a wrench) while simultaneously preventing the main rod from rotating with an anti-rotation tool (e.g., an allen wrench), thereby pulling the split sleeve away from the structure. As a result, a stuck split sleeve may be easily and safely removed from a structure, thereby increasing the efficiency of coldworking manufacturing processes involving split sleeves.

Figure 2:
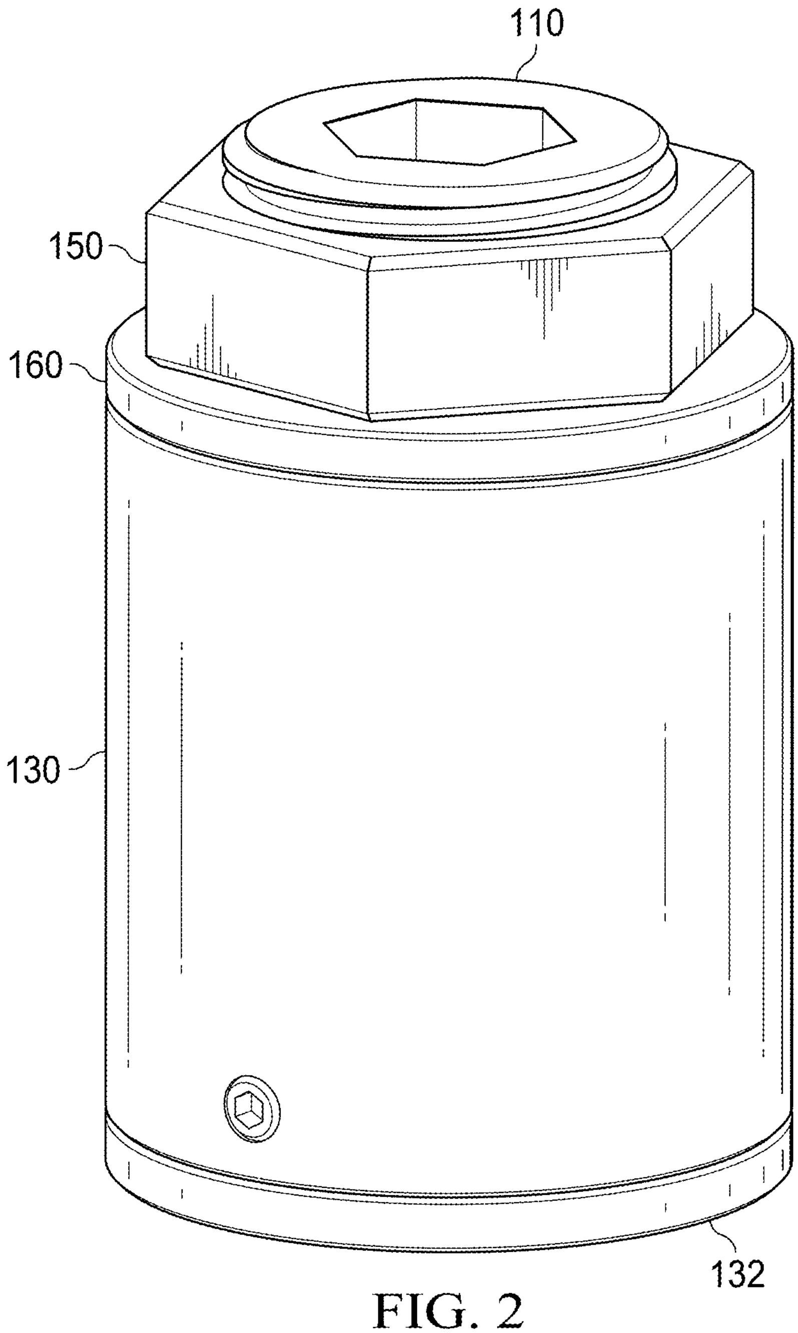
FIG. 2 is an illustration of an assembled sleeve removal tool, according to particular embodiments.
Figure 3:
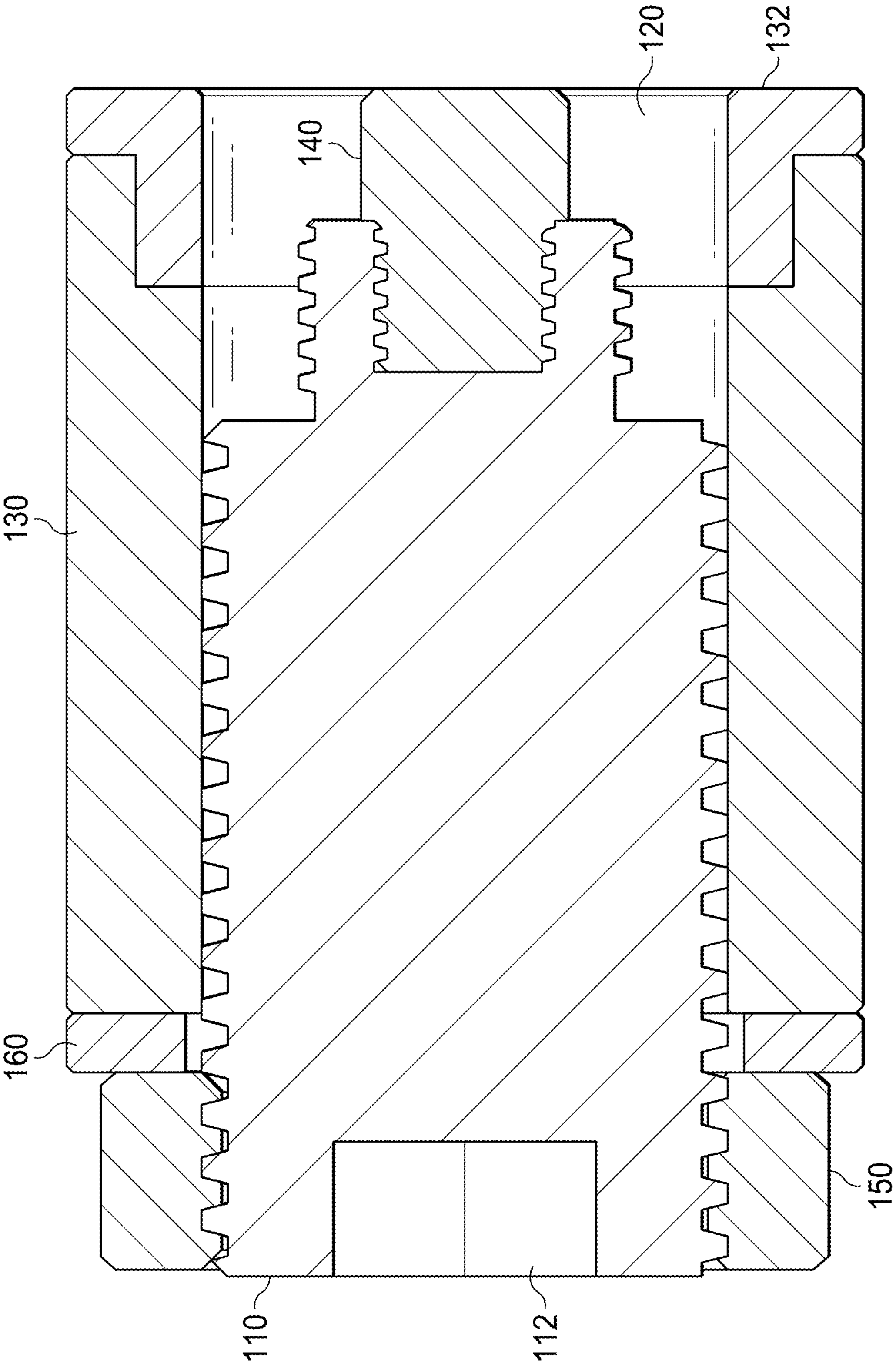
FIG. 3 is a cutaway view of a sleeve removal tool, according to particular embodiments.

FIGS. 1-3 are diagrams illustrating a sleeve removal tool 100 that may be used to remove a split sleeve embedded in a structure, according to particular embodiments. FIG. 1 illustrates a disassembled sleeve removal tool 100 showing the various components of sleeve removal tool 100, FIG. 2 illustrates an assembled sleeve removal tool 100, and FIG. 3 illustrates a cutaway view of sleeve removal tool 100. In some embodiments, sleeve removal tool 100 includes a main rod 110, a nose cap 120, a housing 130, a pin 140, a nut 150, and a washer 160. Nose cap 120 removably couples to both main rod 110 and a split sleeve that is embedded in a structure. Housing 130 is configured to be placed around main rod 110 and nose cap 120 and to contact a portion of the structure around a stuck split sleeve. Pin 140 may be removably coupled to main rod 110 and may include a size/shape that permits pin 140 to be inserted into the stuck split sleeve. Nut 150 may be threaded onto main rod 110 and may be tightened against main rod 110 in order to force main rod 110 away from the stuck split sleeve, thereby removing the stuck split sleeve from the structure.

Figure 8A:
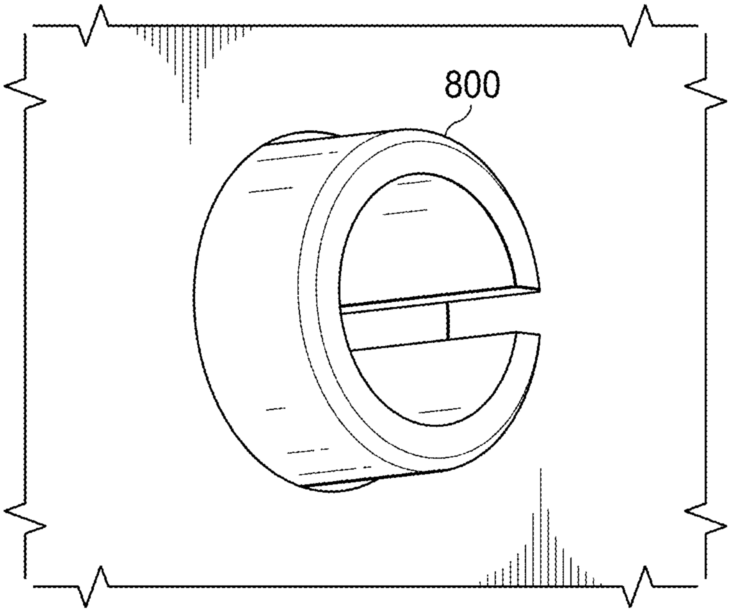
FIGS. 8A-8H illustrate the steps of the method for removing a split sleeve embedded in a structure of FIG. 7, according to particular embodiments.
Figure 8B:
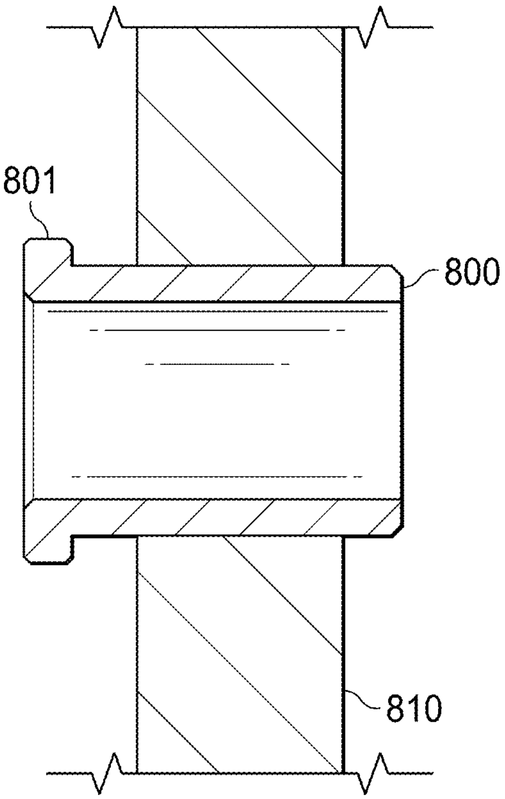

In general, sleeve removal tool 100 may be used to quickly, efficiently, and safely remove a split sleeve embedded in a structure. An example of a split sleeve 800 that is embedded in a structure 810 is illustrated in FIGS. 8A and 8B. To remove split sleeve 800 that is embedded in structure 810, nose cap 120 may first be placed over the flare of split sleeve 800. Main rod 110 may then be attached to nose cap 120 (e.g., by screwing a neck portion 118 of main rod 110 into nose cap 120) and pin 140 may be inserted into split sleeve 800, thereby clamping the flare of the split sleeve 800 between a portion of nose cap 120 and a portion of main rod 110. Housing 130 may then be placed over main rod 110 such that a non-marking foot 132 of housing 130 contacts the portion of structure 810 around the stuck split sleeve 800. Nut 150 may then be threaded onto main rod 110 (e.g., threaded onto main threaded portion 116) until it contacts housing 130. In some embodiments, washer 160 may be placed between nut 150 and housing 130. Nut 150 may then be tightened against housing 130 (e.g., using a wrench) while simultaneously preventing main rod 110 from rotating with an anti-rotation tool (e.g., an allen wrench), thereby pulling the split sleeve 800 away from the structure 810. As a result, a stuck split sleeve 800 may be easily and safely removed from structure 810, thereby increasing the efficiency of coldworking manufacturing processes involving split sleeves.

Figure 4A:
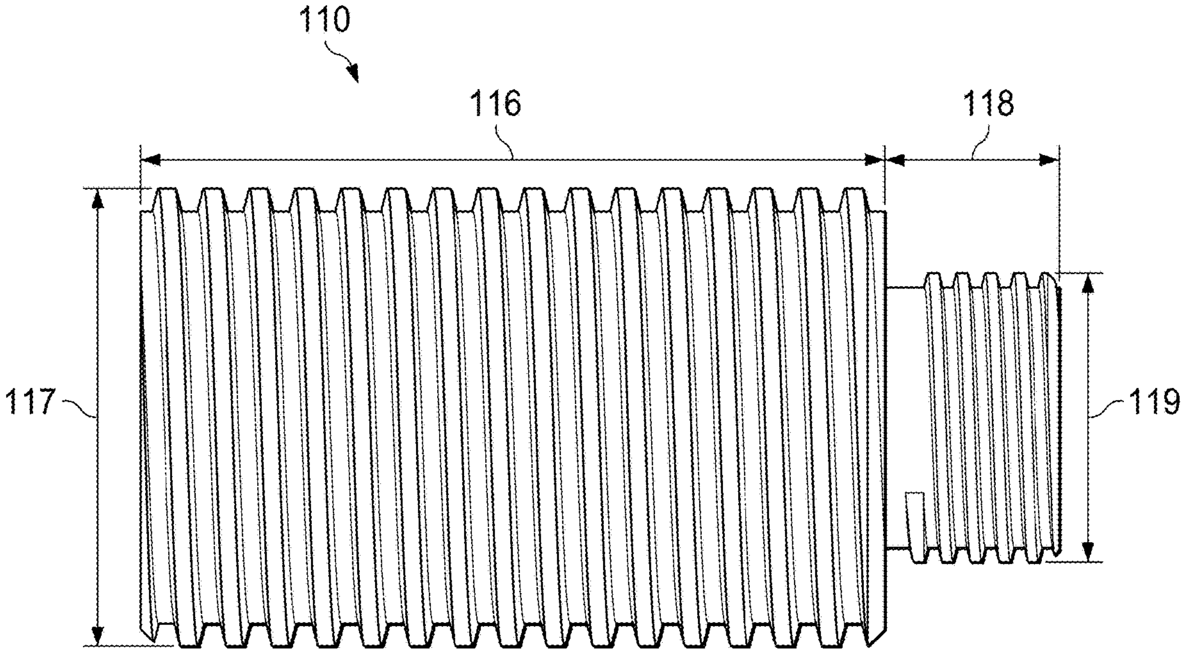
FIGS. 4A-4C are illustrations of a main rod of the sleeve removal tool of FIGS. 1-3, according to particular embodiments.
Figure 4B:
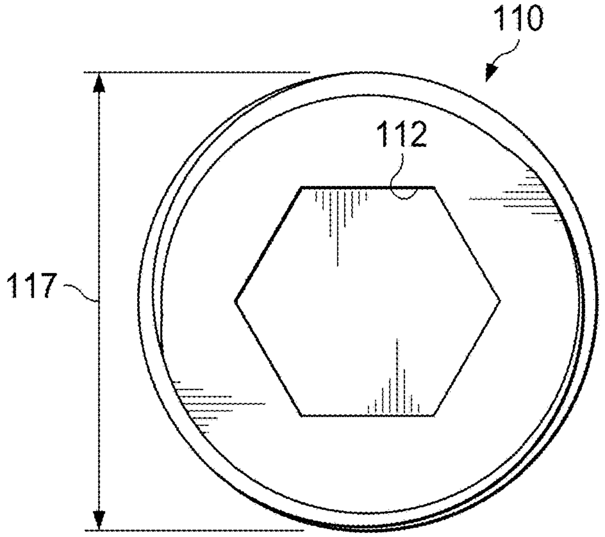
Figure 4C:
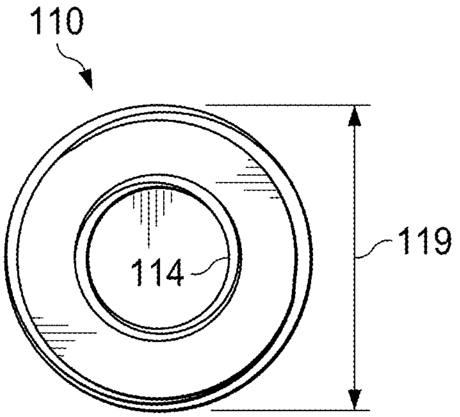

Main rod 110 is the main structural component of sleeve removal tool 100. A particular embodiment of main rod 110 is illustrated in FIGS. 4A-4C. In some embodiments, sleeve removal tool 100 is cylindrical in shape as illustrated. In some embodiments, main rod 110 is made of metal, but any other appropriate material may be used. In some embodiments, main rod 110 includes a main threaded portion 116 and a neck portion 118, as illustrated in FIG. 4A. Main threaded portion 116 is partially or fully threaded with threads that match threads of nut 150 and permit nut 150 to be threaded onto main rod 110 as described herein. In some embodiments, main threaded portion 116 is on an opposite end of main rod 110 from neck portion 118. In some embodiments, main threaded portion 116 is a first diameter 117 in size, and neck portion 118 is a second diameter 119 in size that is smaller than first diameter 117.

In some embodiments, main rod 110 includes an anti-rotation aperture 112 that permits a tool to be inserted into main rod 110 in order to prevent main rod 110 from rotating during operation, as illustrated in FIG. 4B. In some embodiments, anti-rotation aperture 112 is on an end of main rod 110 that is opposite from neck portion 118 (i.e., proximate to main threaded portion 116 as illustrated). In some embodiments, anti-rotation aperture 112 has a shape that permits an allen/hex wrench to be inserted into main rod 110 in order to prevent main rod 110 from rotating. In other embodiments, anti-rotation aperture 112 may be any other appropriate shape (e.g., a slot for a screwdriver, etc.).

In some embodiments, main rod 110 includes a pin aperture 114 that permits pin 140 to be coupled (e.g., threaded into) to main rod 110, as illustrated in FIG. 4C. In some embodiments, pin aperture 114 is on an end of main rod 110 that is opposite from main threaded portion 116 (i.e., proximate to neck portion 118). In some embodiments, pin aperture 114 is partially or fully threaded with threads that match threads of pin 140 and permit pin 140 to be threaded into main rod 110 as described herein.

Figure 5A:
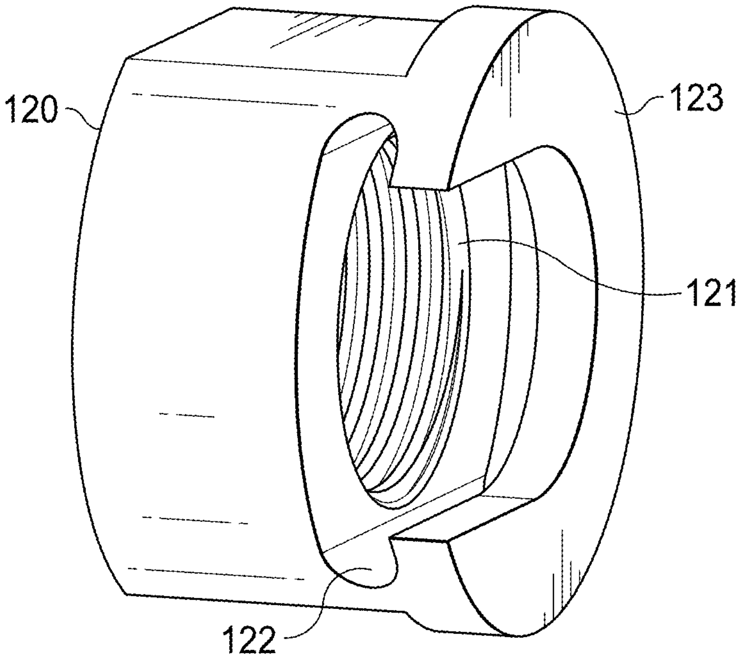
FIGS. 5A-5B are various views of a nose cap of the sleeve removal tool of FIGS. 1-3, according to particular embodiments.
Figure 5B:
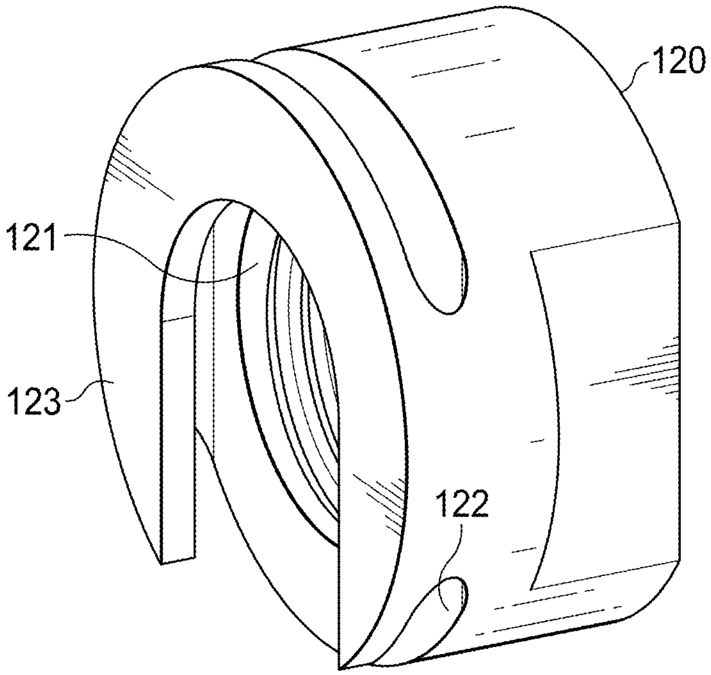

Nose cap 120 is a component of sleeve removal tool 100 that removably attaches to both main rod 110 and split sleeve 800 and permits sleeve removal tool 100 to remove split sleeve 800 from structure 810. Particular examples of nose cap 120 are illustrated in FIGS. 5A and 5B. In some embodiments, nose cap 120 includes a main threaded aperture 121 that permits nose cap 120 to be threaded onto neck portion 118 of main rod 110. In some embodiments, nose cap 120 includes a groove 122 that is sized to accommodate the flare of split sleeve 800. In some embodiments, groove 122 is a slot that is cut into nose cap 120 proximate to one end of nose cap 120 as illustrated. In some embodiments, nose cap 120 includes a U-shaped member 123 that forms one end of nose cap 120 as illustrated. In some embodiments, U-shaped member 123 is placed against structure 810 when nose cap 120 is coupled to split sleeve 800.

Housing 130 is a component of sleeve removal tool 100 that is configured to be placed over main rod 110 and nose cap 120 once nose cap 120 has been coupled to split sleeve 800 and main rod 110 has been coupled to nose cap 120. In some embodiments, housing 130 is made of metal, but may be made of any appropriate material in other embodiments. In some embodiments, housing 130 is tubular in shape as illustrated and includes an inner diameter that matches or is less than first diameter 117 of main threaded portion 116 of main rod 110 in order to permit housing 130 to slide over main rod 110. In some embodiments, main rod 110 includes a non-marking foot 132 on one end of housing 130 as illustrated. In some embodiments, non-marking foot is secured to housing 130 using any appropriate fastener (e.g., a ⅛×¼ slotted spring pin). In general, non-marking foot 132 is made of any appropriate material that will not mark or damage structure 810 (e.g., Delrin and the like). When installed around main rod 110, non-marking foot 132 of housing 130 contacts the portion of structure 810 that surrounds split sleeve 800. In addition, housing 130 includes a surface 134 that is the opposite end of housing 130 from non-marking foot 132. Surface 134 of housing 130 contacts nut 150 (or, in some embodiments, washer 160) during operation of sleeve removal tool 100.

Figure 6:
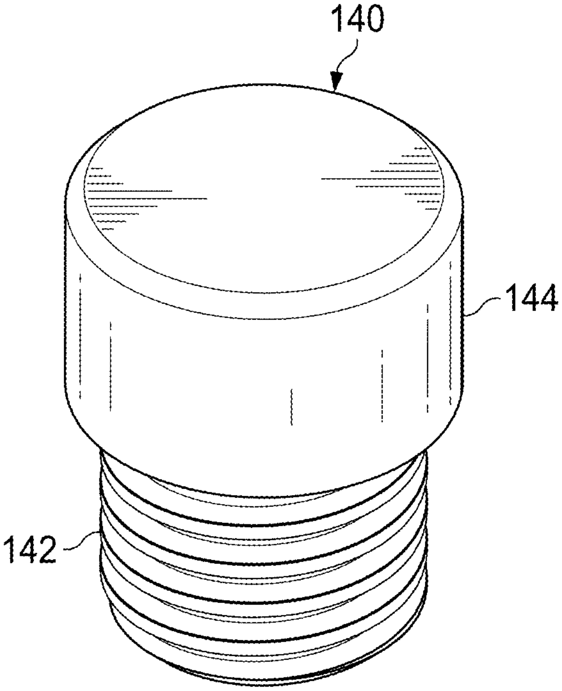
FIG. 6 is an illustration of a pin of the sleeve removal tool of FIGS. 1-3, according to particular embodiments.

Pin 140 is a component of sleeve removal tool 100 that is configured to be removably coupled to neck portion 118 of main rod 110 (e.g., by being threaded into pin aperture 114 of main rod 110). A particular embodiment of pin 140 is illustrated in FIG. 6. As illustrated in FIG. 6, some embodiments of pin 140 include a threaded portion 142 and an unthreaded portion 144. Threaded portion 142 is used to secure pin 140 to pin aperture 114 of main rod 110, and unthreaded portion 144 includes a diameter that permits pin 140 to be inserted into split sleeve 800. In general, unthreaded portion 144, once inserted into split sleeve 800, functions to stabilize sleeve removal tool 100 during removal operations of split sleeve 800. Pin 140 may be easily changed to any appropriate size to accommodate any size of split sleeve 800.

In operation, sleeve removal tool 100 may be used to quickly, efficiently, and safely remove a split sleeve 800 embedded in a structure 810. To remove split sleeve 800 that is embedded in structure 810, nose cap 120 may first be placed over the flare of split sleeve 800 that is embedded in structure 810. For example, the flare of split sleeve 800 may be slid into groove 122 of nose cap 120 such that U-shaped member 123 contacts structure 810 and split sleeve 800 is aligned with main threaded aperture 121 of nose cap 120. Next, main rod 110 may be attached to nose cap 120. For example, neck portion 118 of main rod 110 may be screwed into main threaded aperture 121 of nose cap 120. In embodiments where pin 140 is utilized, pin 140 will pass through main threaded aperture 121 of nose cap 120 and will be inserted into split sleeve 800 as neck portion 118 of main rod 110 is screwed into main threaded aperture 121 nose cap 120. The process of screwing main rod 110 into nose cap 120 clamps the flare of split sleeve 800 between a portion of nose cap 120 and a portion of main rod 110, thereby securing split sleeve 800 to sleeve removal tool 100.

Once main rod 110 is coupled to nose cap 120, housing 130 may then be placed over main rod 110 such that a non-marking foot 132 of housing 130 contacts the structure

810 around the stuck split sleeve 800. Nut 150 may then be threaded onto main rod 110 (e.g., threaded onto main threaded portion 116) until it contacts housing 130. In some embodiments, washer 160 may be placed between nut 150 and housing 130. Nut 150 may then be tightened against housing 130 (e.g., using a wrench) while simultaneously preventing main rod 110 from rotating with an anti-rotation tool (e.g., an allen wrench), thereby pulling the split sleeve 800 away from the structure 810. As a result, a stuck split sleeve 800 may be easily and safely removed from structure 810, thereby increasing the efficiency of coldworking manufacturing processes involving split sleeves.

Figure 7:
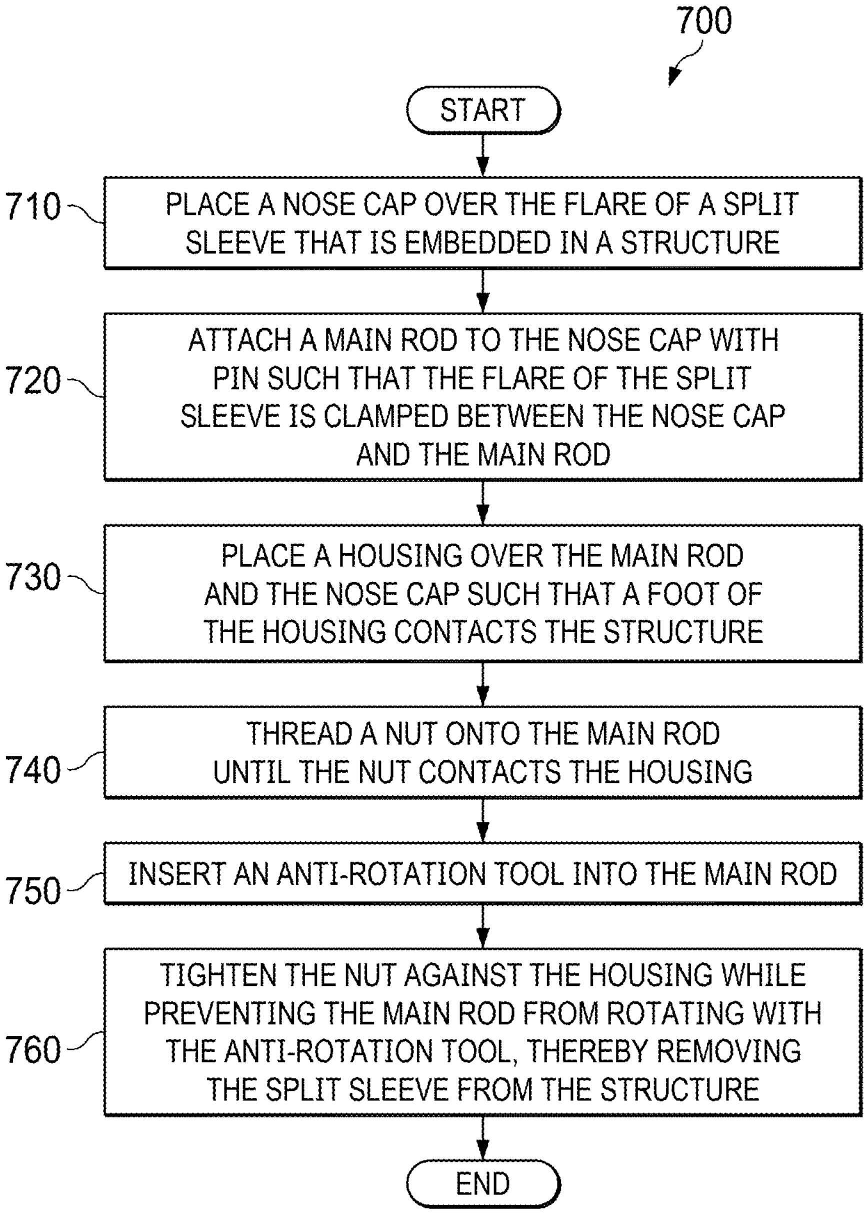
FIG. 7 is a chart illustrating a method for removing a split sleeve embedded in a structure, according to particular embodiments.

FIG. 7 is a chart illustrating a method 700 for removing a split sleeve embedded in a structure, according to particular embodiments. In some embodiments, method 700 may be performed using sleeve removal tool 100. In some embodiments, the split sleeve is split sleeve 800 that is embedded in structure 810 as illustrated in FIGS. 8A and 8B.

Figure 8C:
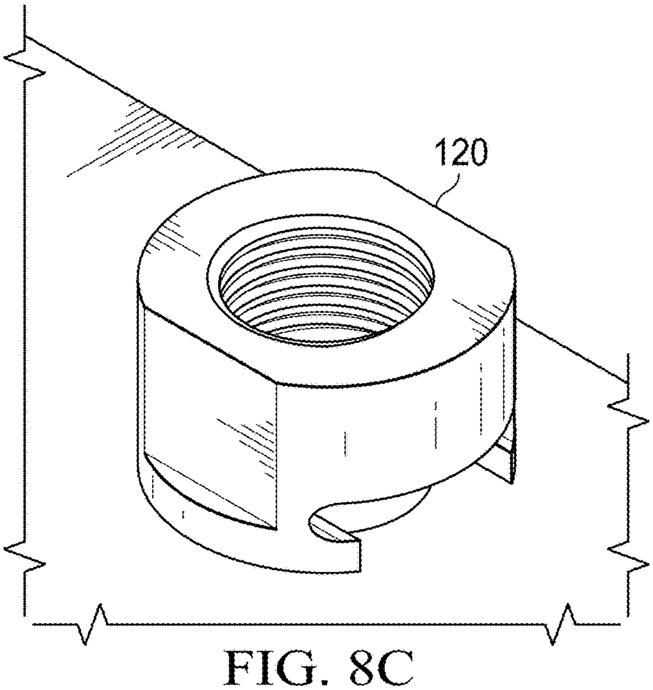
Figure 8D:
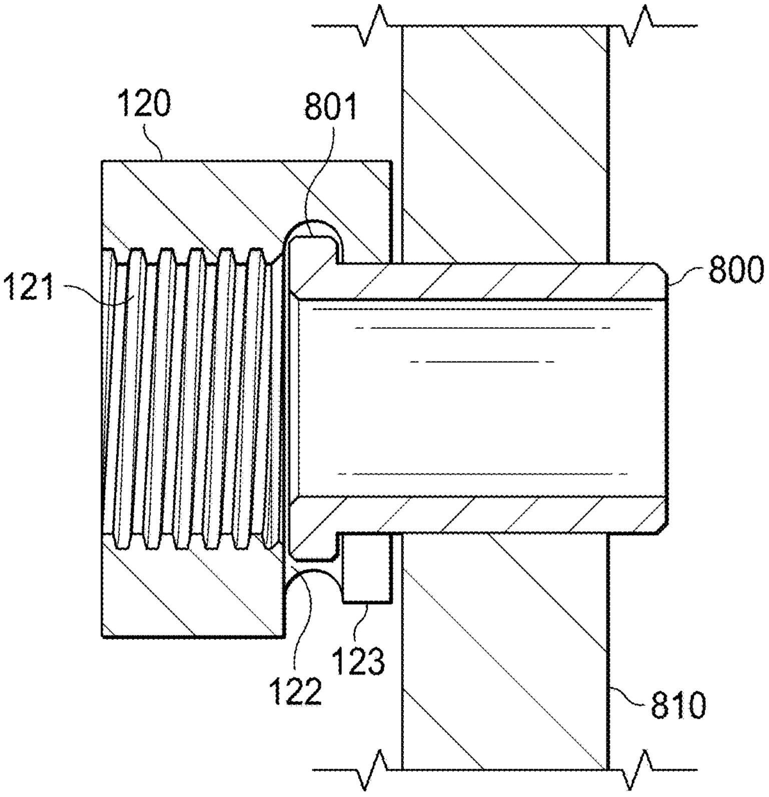

At step 710, a nose cap of a sleeve removal tool is placed over a flare of the split sleeve embedded in the structure. Step 710 is illustrated in more detail in FIGS. 8C-8D. In some embodiments, the nose cap is nose cap 120. In some embodiments, flare 801 of split sleeve 800 is slid into groove 122 of nose cap 120 in this step such that split sleeve 800 is aligned with main threaded aperture 121 and U-shaped member 123 contacts the area of structure 810 around split sleeve 800.

Figure 8E:
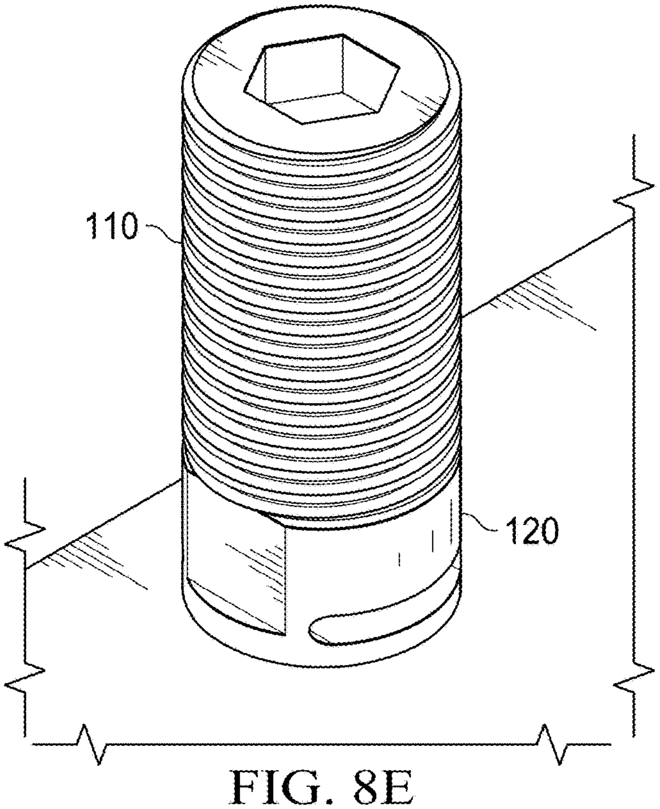
Figure 8F:
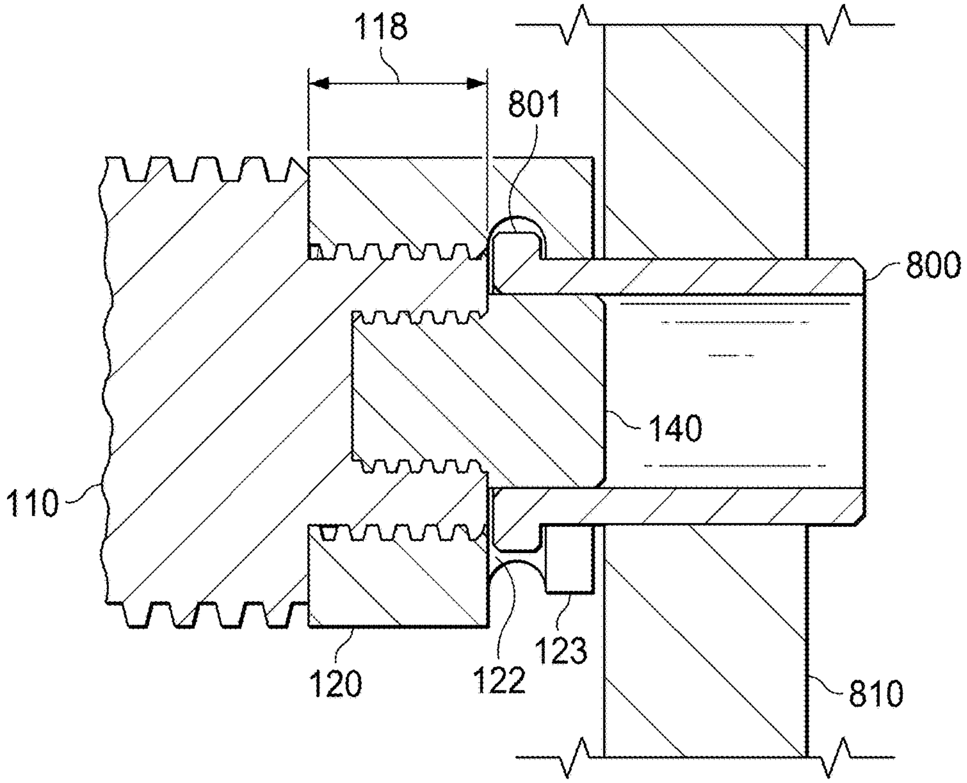

At step 720, a main rod of the sleeve removal tool is attached to the nose cap of step 710. In some embodiments, the main rod is main rod 110 of sleeve removal tool 100. In some embodiments, step 720 includes screwing neck portion 118 of main rod 110 into main threaded aperture 121 of nose cap 120 as illustrated in FIG. 8E. In some embodiments, main rod 110 is screwed into nose cap 120 such that flare 801 of the split sleeve 800 is clamped between a portion of the nose cap 120 and a portion of the main rod 110 as illustrated in FIG. 8F. For example, flare 801 may be clamped between U-shaped member 123 and neck portion 118 of main rod 110. The clamping of flare 801 of split sleeve 800 between a portion of the nose cap 120 and a portion of the main rod 110 secures split sleeve 800 to sleeve removal tool 100 during the operation of method 700.

Figure 8G:
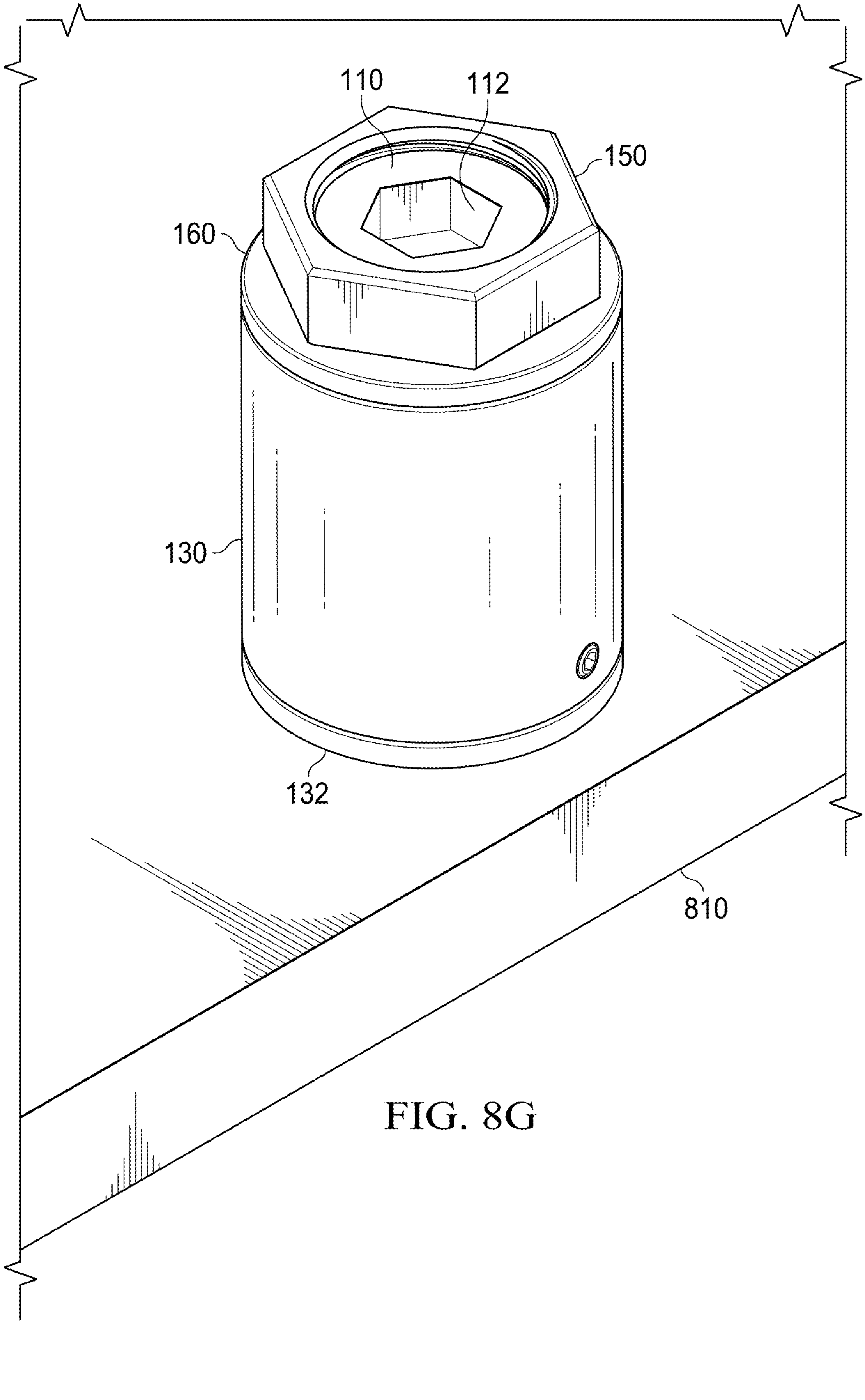

At step 730, a housing of the sleeve removal tool is placed over the main rod and the nose cap such that a non-marking foot of the housing contacts the structure. Step 730 is illustrated in more detail in FIG. 8G. In some embodiments, the housing is housing 130 and the non-marking foot is non-marking foot 132. In some embodiments, the housing is placed over the main rod such that at least a portion of main threaded portion 116 (i.e., the end of main rod 110 that contains anti-rotation aperture 112) protrudes out of the housing.

At step 740, a nut is threaded onto the main rod until the nut contacts the housing. Step 740 is also illustrated in more detail in FIG. 8G. In some embodiments, the nut is nut 150 that is threaded onto main threaded portion 116 of main rod 110. In some embodiments, a washer (e.g., washer 160) is placed between the nut and the housing as illustrated.

Figure 8H:
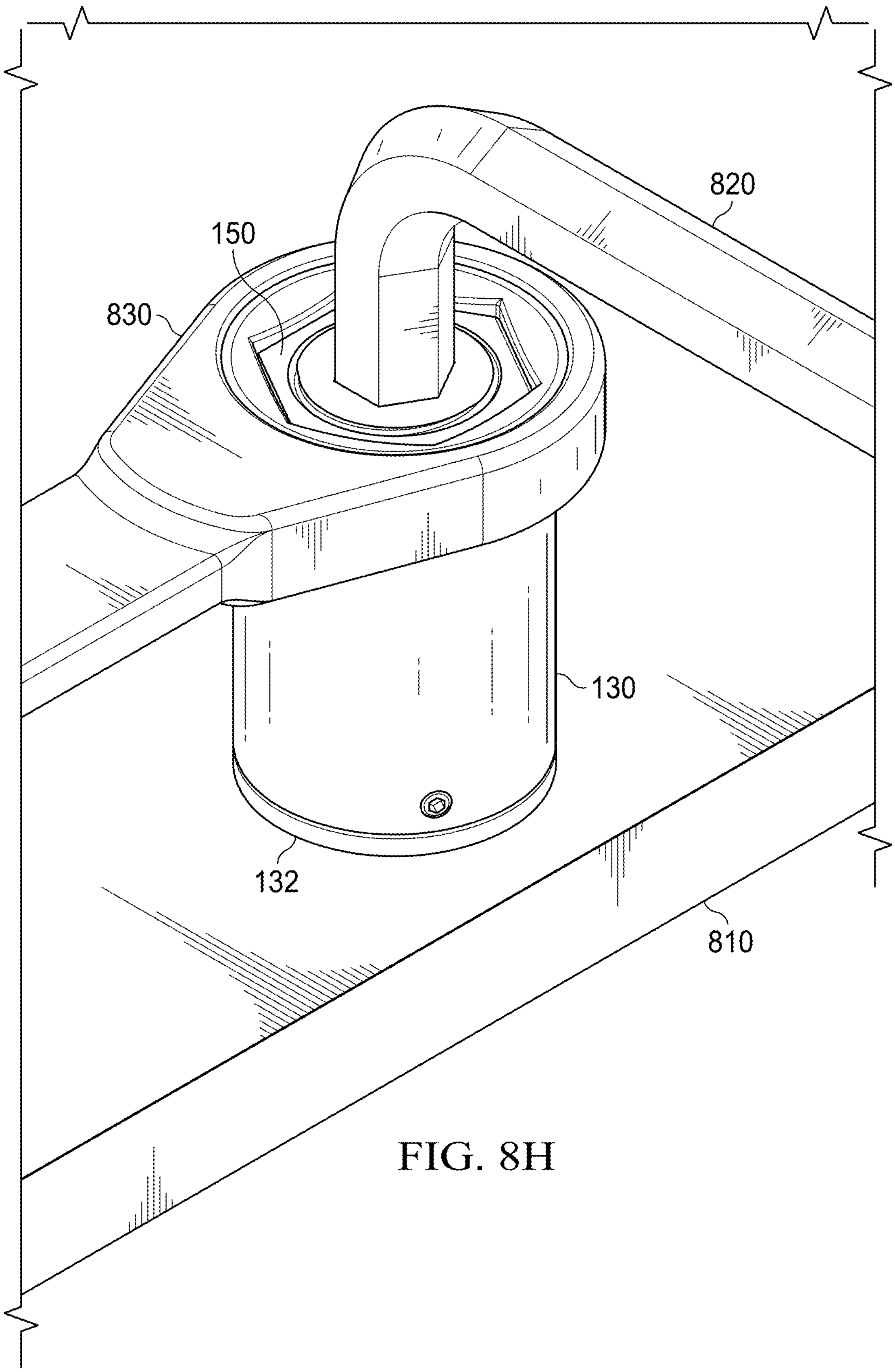

At step 750, an anti-rotation tool (e.g., anti-rotation tool 820) is inserted into the main rod. Step 750 is illustrated in more detail in FIG. 8H. In some embodiments, the anti-rotation tool is an allen/hex wrench 820 that is inserted into anti-rotation aperture 112 of main rod 110. In other embodiments, the anti-rotation tool may be any other appropriate tool such as a screwdriver.

At step 760, the nut installed in step 740 is tightened against the housing (or the washer) while the main rod is prevented from rotating with the anti-rotation tool of step 750, thereby removing split sleeve 800 from structure 810. Step 760 is illustrated in more detail in FIG. 8H. In some embodiments, the nut is tightened with a wrench 830. After step 760, method 700 may end.

In some embodiments, method 700 includes an additional step of coupling a pin to the main rod. In some embodiments, the pin is pin 140. In some embodiments, the pin includes a diameter that permits the pin to be inserted into the split sleeve that is embedded in the structure. In some embodiments, step 720 includes inserting the pin into the flare of the split sleeve, thereby facilitating the clamping of the flare of the split sleeve between a portion of the nose cap and a portion of the main rod as described herein.

Particular embodiments may repeat one or more steps of the method of FIG. 7, where appropriate. Although this disclosure describes and illustrates particular steps of the method of FIG. 7 as occurring in a particular order, this disclosure contemplates any suitable steps of the method of FIG. 7 occurring in any suitable order. Moreover, although this disclosure describes and illustrates an example method including the particular steps of the method of FIG. 7, this disclosure contemplates any suitable method including any suitable steps, which may include all, some, or none of the steps of the method of FIG. 7, where appropriate. Furthermore, although this disclosure describes and illustrates particular components, devices, or systems carrying out particular steps of the method of FIG. 7, this disclosure contemplates any suitable combination of any suitable components, devices, or systems carrying out any suitable steps of the method of FIG. 7.

Although the present disclosure and its advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present disclosure, processes, machines, manufacture, compositions of matter, means, methods, or steps, presently existing or later to be developed that perform substantially the same function or achieve substantially the same result as the corresponding embodiments described herein may be utilized according to the present disclosure. Accordingly, the appended claims are intended to include within their scope such processes, machines, manufacture, compositions of matter, means, methods, or steps.

Moreover, the description in this patent document should not be read as implying that any particular element, step, or function can be an essential or critical element that must be included in the claim scope. Also, none of the claims can be intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "member," "module," "device," "unit," "component," "element," "mechanism," "apparatus," "machine," "system," "processor," "processing device," or "controller" within a claim can be understood and intended to refer to structures known to those skilled in the relevant art, as further modified or enhanced by the features of the claims themselves, and can be not intended to invoke 35 U.S.C. § 112(f). Even under the broadest reasonable interpretation, in light of this paragraph of this specification, the claims are not intended to invoke 35 U.S.C. § 112(f) absent the specific language described above.

While the include figures illustrate particular embodiments having particular components, this disclosure contemplates other embodiments having some or all of the described components, as well as additional components not described. Components of the present disclosure may be any suitable shape and may be in any suitable configuration.

As used in this document, "each" refers to each member of a set or each member of a subset of a set. Furthermore, as used in the document "or" is not necessarily exclusive and, unless expressly indicated otherwise, can be inclusive in certain embodiments and can be understood to mean "and/or." Similarly, as used in this document "and" is not necessarily inclusive and, unless expressly indicated otherwise, can be inclusive in certain embodiments and can be understood to mean "and/or."

The disclosure may be embodied in other specific forms without departing from the spirit or essential characteristics thereof. For example, each of the new structures described herein, may be modified to suit particular local variations or requirements while retaining their basic configurations or structural relationships with each other or while performing the same or similar functions described herein. The present embodiments are therefore to be considered in all respects as illustrative and not restrictive. Accordingly, the scope of the disclosures can be established by the appended claims rather than by the foregoing description. All changes which come within the meaning and range of equivalency of the claims are therefore intended to be embraced therein. Further, the individual elements of the claims are not well-understood, routine, or conventional. Instead, the claims are directed to the unconventional inventive concept described in the specification.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, functions, operations, or steps, any of these embodiments may include any combination or permutation of any of the components, elements, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

The invention claimed is:

1. A sleeve removal tool for removing a split sleeve embedded in a structure, the sleeve removal tool comprising:

a main rod comprising a main threaded portion and a neck portion;

a nose cap configured to:

removably couple to the neck portion of the main rod; and removably couple to a flare of the split sleeve embedded in the structure;

a housing comprising a non-marking foot, the housing configured to at least partially surround the main rod; and a nut configured to be threaded onto the main threaded portion of the main rod, wherein threading the nut onto the main threaded portion of the main rod forces the housing against the structure and forces the main rod away from the structure, thereby removing the split sleeve from the structure.

2. The sleeve removal tool of claim 1, wherein the housing is tubular in shape.

3. The sleeve removal tool of claim 1, further comprising a washer that is installed around the main threaded portion of the main rod between the nut and the housing.

4. The sleeve removal tool of claim 1, further comprising a pin that is configured to be removably coupled to the neck portion of the main rod, the pin comprising a diameter that permits the pin to be inserted into the split sleeve.

5. The sleeve removal tool of claim 1, wherein the main rod comprises an anti-rotation aperture on an end of the main rod opposite the neck portion.

6. The sleeve removal tool of claim 1, wherein the nose cap comprises a groove configured to accept the flare of the split sleeve.

7. The sleeve removal tool of claim 1, wherein:

the main threaded portion of the main rod comprises a first diameter; and the neck portion of the main rod comprises a second diameter that is smaller than the first diameter.

8. A sleeve removal tool for removing a split sleeve embedded in a structure, the sleeve removal tool comprising:

a main rod;

a nose cap configured to:

removably couple to the main rod; and removably couple to a flare of the split sleeve embedded in the structure;

a housing configured to at least partially surround the main rod; and a nut configured to be threaded onto the main rod, wherein threading the nut onto the main rod forces the housing against the structure and forces the main rod away from the structure, thereby removing the split sleeve from the structure.

9. The sleeve removal tool of claim 8, wherein the housing is tubular in shape.

10. The sleeve removal tool of claim 8, further comprising a washer that is installed around the main rod between the nut and the housing.

11. The sleeve removal tool of claim 8, further comprising a pin that is configured to be removably coupled to the main rod, the pin comprising a diameter that permits the pin to be inserted into the split sleeve.

12. The sleeve removal tool of claim 8, wherein the main rod comprises an anti-rotation aperture on an end of the main rod opposite the nose cap.

13. The sleeve removal tool of claim 12, wherein the anti-rotation aperture comprises an aperture for an allen wrench.

14. The sleeve removal tool of claim 8, wherein the nose cap comprises a groove configured to accept the flare of the split sleeve.

* * * * *